United States Patent
Murphy et al.

(10) Patent No.: US 12,441,746 B2
(45) Date of Patent: Oct. 14, 2025

(54) HCK INHIBITORS FOR THE TREATMENT OF FIBROSIS AND CANCER

(71) Applicant: Icahn School of Medicine at Mount Sinai, New York, NY (US)

(72) Inventors: Barbara Murphy, New York, NY (US); Bhaskar Das, West Nyack, NY (US); Chengguo Wei, New York, NY (US); Li Li, New York, NY (US)

(73) Assignee: Icahn School of Medicine At Mount Sinai, New York, NY (US)

( * ) Notice: Subject to any disclaimer, the term of this patent is extended or adjusted under 35 U.S.C. 154(b) by 497 days.

(21) Appl. No.: 18/001,114

(22) PCT Filed: Jun. 9, 2021

(86) PCT No.: PCT/US2021/036644
§ 371 (c)(1),
(2) Date: Dec. 8, 2022

(87) PCT Pub. No.: WO2021/252650
PCT Pub. Date: Dec. 16, 2021

(65) Prior Publication Data
US 2023/0212197 A1     Jul. 6, 2023

Related U.S. Application Data

(60) Provisional application No. 63/037,174, filed on Jun. 10, 2020.

(51) Int. Cl.
    *C07F 5/02*     (2006.01)
    *A61P 13/12*     (2006.01)

(52) U.S. Cl.
    CPC .............. *C07F 5/027* (2013.01); *A61P 13/12* (2018.01)

(58) Field of Classification Search
    CPC ............ C07F 5/027; A61P 13/12; A61P 35/00
    See application file for complete search history.

(56) References Cited

U.S. PATENT DOCUMENTS

| | | |
|---|---|---|
| 2009/0182133 A1 | 7/2009 | Puah et al. |
| 2018/0118732 A1 | 5/2018 | Lin et al. |
| 2019/0352292 A1 | 11/2019 | He et al. |
| 2022/0177464 A1 | 6/2022 | Murphy et al. |

FOREIGN PATENT DOCUMENTS

WO     2020205921 A1     10/2020

OTHER PUBLICATIONS

Pubchem, Substance Record for SID 47716945, retrieved on Jun. 29, 2020 from https://pubchem.ncbi.nlm.nih.gov/substance/47716945, 6 pages, Feb. 20, 2008.
Pubchem, Substance Record for SID 79360011, retrieved on May 15, 2020 from https://pubchem.ncbi.nlm.nih.gov/substance/79360011, 7 pages, Jun. 12, 2009.
Pubchem, Substance Record for SID 160642534, retrieved on Aug. 19, 2021 from https://pubchem.ncbi.nlm.nih.gov/substance/160642534, 5 pages, Dec. 3, 2012.
Pir et al., "Synthesis, Characterization, Antimicrobial Activity, and QSAR Studies on Substituted Oxadiazaboroles", Medicinal Chemistry Research, vol. 25, pp. 1794-1812, 2016.
Pubchem, Substance Record for SID 319204107, retrieved on May 15, 2020 from https://pubchem.ncbi.nlm.nih.gov/substance/319204107, 6 pages, Nov. 29, 2016.
Written Opinion and International Search Report in International Application No. PCT/US2020/026093, 11 pages, Jul. 24, 2020.
Written Opinion and International Search Report in International Application No. PCT/US2021/36644, 7 pages, Sep. 23, 2021.

*Primary Examiner* — Kortney L. Klinkel
*Assistant Examiner* — Faidat Jyoti
(74) *Attorney, Agent, or Firm* — Heslin Rothenberg Farley & Mesiti P.C.

(57) ABSTRACT

Compounds which are oxadiazaborole derivatives are disclosed, including compounds of the following genus:

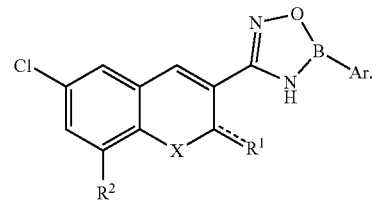

The compounds are inhibitors of hematopoietic cell kinase (HCK) and exhibit anti-fibrotic and anti-proliferative effects. They are useful in the treatment of a variety of disorders, including a fibrosis or a fibrotic disease, such as renal fibrosis.

20 Claims, 4 Drawing Sheets

HCK INHIBITORS FOR THE TREATMENT OF FIBROSIS AND CANCER

CROSS REFERENCE TO RELATED APPLICATIONS

This application is a U.S. National Phase filing under 35 U.S.C. § 371 of International Application PCT/US2021/036644, filed Jun. 9, 2021, and published as WO 2021/252650 on Dec. 16, 2021. PCT/US2021/036644 claims priority of U.S. provisional application 63/037,174, filed Jun. 10, 2020. The entire contents of each of these prior applications are hereby incorporated herein by reference.

BACKGROUND OF THE INVENTION

Technical Field

This invention relates to oxadiazaborole-containing compounds that are inhibitors of HCK. The compounds disclosed are useful in treatment of fibrosis, fibrotic diseases, and various cancers and autoimmune diseases.

Background Information

Many people are affected unfavorably by fibrotic diseases, which can cause adverse life changes, organ failure, and death. Fibrotic disease is found in many organs of the body, yet its pathophysiology is not well understood. Cirrhosis (liver), keloids (skin), and pulmonary fibrosis and cystic fibrosis (lung) are diseases and disorders that affect many people worldwide. Fibrosis and fibrotic diseases can have genetic causes and/or may be induced by external factors, such as infection, surgery, diet, or radiation.

Renal fibrosis is a representative fibrotic disease, and it is an important topic that attracts broad interest in nephrology owing to its status as a hallmark and common outcome across all kinds of progressive chronic kidney disease (CKD). CKD and chronic renal allograft injury (CAI) are worldwide health problems. They are associated with high mortality and morbidity as well as tremendous costs associated with renal replacement. Renal fibrosis is the final common pathway of progression of CKD and CAI. Renal fibrosis underlies the progression of chronic kidney disease (CKD) to end-stage renal disease (ESRD). CKD affected approximately 38.56 million people in the United States in 2012, and it is estimated that the prevalence of CKD in the United States will increase to 46.23 million by 2022. According to the NIDDK, 14% of Americans were afflicted with CKD in 2012.

There is currently no cure for CKD, and current treatments are aimed at slowing its progression. For instance, renin-angiotensin-aldosterone system blockers may decrease the risk of progression, but only by about 20%. Dialysis and renal transplant are the only options for patients with ESRD. However, renal transplants bring a high risk of rejection or developing fibrosis, and dialysis is a high-cost treatment.

Hematopoietic cell kinase (HCK) is a member of the Src-family of non-receptor tyrosine kinases. Previous work has shown that hematopoietic cell kinase (HCK) is the key driver in renal fibrosis progression. HCK has been shown to be strongly associated with renal fibrosis in in vitro and in vivo experiments. Further, data have shown that targeting HCK can attenuate renal fibrosis and improve kidney functions. HCK also has recently been identified as a cancer target of the Src-Tyrosine Kinase family. Previous work has demonstrated that inhibition of HCK also improved renal function, reduced albuminuria, decreased collagen and fibronectin expression, and inhibited expression of profibrotic markers in animal models with lupus nephritis (e.g., MRL-lpr lupus mice) and folic acid nephropathy.

There is an urgent need for safe and effective anti-fibrotic treatments. The inhibition of HCK can provide a therapeutic strategy for the treatment of fibrosis and fibrotic diseases in patients.

SUMMARY OF THE INVENTION

In a first aspect the invention relates to compounds of formula (I):

wherein
- X is selected from O, $NR^3$, and S;
- $R^1$ is selected from O and phenyl optionally substituted with one or more substituents selected from $C_1$-$C_6$ alkyl, $C_1$-$C_6$ alkoxy, $C_1$-$C_6$ fluoroalkyl, and halogen;
- $R^2$ is selected from halogen, hydrogen, $C_1$-$C_6$ alkyl, $C_1$-$C_3$ alkoxy, $C_1$-$C_3$ fluoroalkyl, and phenyl;
- $R^3$ is selected from hydrogen and $C_1$-$C_6$ alkyl;
- Ar is selected from phenyl, a 5-membered heteroaryl, and a 6-membered heteroaryl, wherein said phenyl, 5-membered heteroaryl, or 6-membered heteroaryl is optionally substituted with amino, cyano, halogen, hydroxy, —C(O)$NH_2$, —C(=O)$OR^4$, $C_1$-$C_6$ alkyl, $C_1$-$C_6$ haloalkyl, $C_1$-$C_6$ alkoxy, or $C_1$-$C_6$ haloalkoxy;
- $R^4$ is selected from hydrogen and $C_1$-$C_6$ alkyl; and
- ------ indicates a single bond or a double bond.

In a second aspect, the invention relates pharmaceutical compositions comprising the compounds described herein.

In a third aspect, the invention relates to methods and uses of compounds or pharmaceutical compositions described herein for the treatment of a disease chosen from fibrosis or a fibrotic disease.

In a fourth aspect, the invention relates to methods and uses of compounds or pharmaceutical compositions described herein for the treatment of a disease chosen from chronic kidney disease, renal fibrosis, or chronic renal allograft injury in a patient.

In a fifth aspect, the invention relates to methods and uses of compounds or pharmaceutical compositions described herein for the treatment of a disease chosen from solid malignancy or a hematological malignancy, such as a leukemia or a lymphoma.

In a sixth aspect, the invention relates to methods and uses of compounds or pharmaceutical compositions described herein for the treatment of an autoimmune or inflammatory disease.

In a seventh aspect, the invention relates to methods and uses of compounds or pharmaceutical compositions described herein for treating a disease or disorder in a patient where the disease or disorder involves the dysregulation of hematopoietic cell kinase (HCK) signaling.

In an eighth aspect, the invention relates to methods and uses of compounds or pharmaceutical compositions described herein for inhibiting hematopoietic cell kinase (HCK) activation.

These, and other objects, features and advantages of this invention will become apparent from the following detailed description of the various aspects of the invention taken in conjunction with the accompanying drawings.

DETAILED DESCRIPTION OF THE INVENTION

Renal fibrosis is an important treatment target for many pathophysiologically distinct diseases, since a large variety of diseases converge finally into this single process. However, effective therapies do not exist for renal fibrosis or fibrotic diseases of other organs. It has been shown that targeting HCK can attenuate renal fibrosis and improve kidney functions.

HCK is also thought to be a promising therapeutic target for the treatment of cancer, both solid tumors and hematological malignancies. A relationship between HCK and some viral proteins, such as those related to Human Immunodeficiency Virus (HIV) infection (and AIDS), has also been shown.

HCK is expressed in cells of the myeloid and B-lymphocyte cell lineages. Various types of cancer, including leukemia and solid tumors, are associated with the overactivation of HCK expression. Overactivation of HCK has also been found to have a detrimental effect on drug efficacy and patient survival rates.

Elevated HCK expression in cells is associated with autoimmune and inflammatory diseases. Rheumatoid arthritis (RA) is an autoimmune disease, and one of the hallmarks of RA is inflammation in the individual's joints. HCK was shown to be expressed selectively in fibroblast-like synoviocytes, which are mediators of inflammation in patients with RA. Similarly, the neutrophils of COPD patients have significantly elevated HCK protein levels. Inhibition of HCK in these diseases provides a promising therapy for treating these diseases.

Compounds have been found that are small molecule inhibitors of HCK, with high binding affinity and fewer side effects to attenuate kidney fibrosis. These compounds show potent and specific cytotoxicity in HCK-expressing cells, thereby indicating significant potential for the treatment of patients suffering from a variety of diseases and disorders. In previous studies, HCK was found to be a key mediator of renal fibrosis through the TGF-β/Smad3 pathway.

Substituents are generally defined when introduced and retain that definition throughout the specification and in all independent claims.

In a composition aspect, the invention relates to compounds of formula I:

as described above.

In some embodiments, X is O. In some embodiments, X is $NR^3$. In some embodiments, X is S.

In some embodiments, $R^3$ is hydrogen. In other embodiments, $R^3$ is $C_1$-$C_6$ alkyl. In some embodiments, $R^3$ is selected from methyl, ethyl, propyl or isopropyl. In some embodiments, $R^3$ is methyl. In some embodiments, $R^3$ is selected from hydrogen or methyl.

In some embodiments, $R^1$ is unsubstituted phenyl and ===== is a single bond. In other embodiments, $R^1$ is phenyl substituted with one or more substituents selected from $C_1$-$C_6$ alkyl, $C_1$-$C_6$ alkoxy, $C_1$-$C_6$ fluoroalkyl and halogen. In still other embodiments, $R^1$ is O and ===== is a double bond.

The person of skill will understand that when ===== represents a double bond, the carbon to which it is attached will possess a proton that is not present when ===== represents a single bond. This proton is not drawn in the formulae depicted herein.

In some embodiments, $R^2$ is halogen. In other embodiments, $R^2$ is chloro. In some embodiments, $R^2$ is fluoro. In some embodiments, $R^2$ is hydrogen. In other embodiments, $R^2$ is $C_1$-$C_6$ alkyl. In still other embodiments, $R^2$ is $C_1$-$C_3$ alkyl. In yet other embodiments, $R^2$ is $C_1$-$C_3$ alkoxy. In still other embodiments, $R^2$ is $C_1$-$C_3$ fluoroalkyl. In some embodiments, $R^2$ is methyl. In some embodiments, $R^2$ is methoxy. In yet other embodiments, $R^2$ is phenyl. In yet other embodiments, $R^2$ is unsubstituted phenyl.

In some embodiments, Ar is phenyl. In other embodiments, Ar is unsubstituted phenyl. In still other embodiments, Ar is phenyl substituted with amino, cyano, halogen, hydroxy, —C(O)NH$_2$, —C(=O)OR$^4$, $C_1$-$C_6$ alkyl, $C_1$-$C_6$ haloalkyl, $C_1$-$C_6$ alkoxy, or $C_1$-$C_6$ haloalkoxy.

In some embodiments, Ar is a 5-membered heteroaryl. In other embodiments, Ar is an unsubstituted 5-membered heteroaryl. In still other embodiments, Ar is a 5-membered heteroaryl substituted with amino, cyano, halogen, hydroxy, —C(O)NH$_2$, —C(=O)OR$^4$, $C_1$-$C_6$ alkyl, $C_1$-$C_6$ haloalkyl, $C_1$-$C_6$ alkoxy, or $C_1$-$C_6$ haloalkoxy. In some embodiments, Ar is isoxazole, oxazole, thiazole, furan, pyrazole, thiophene, triazole, pyrrole, imidazole, isothiazole, oxadiazole, triazole, or thiadiazole; any of these may be unsubstituted or substituted.

In some embodiments, Ar is a 6-membered heteroaryl. In other embodiments, Ar is an unsubstituted 6-membered heteroaryl. In still other embodiments, Ar is a 6-membered heteroaryl substituted with amino, cyano, halogen, hydroxy, —C(O)NH$_2$, —C(=O)OR$^4$, $C_1$-$C_6$ alkyl, $C_1$-$C_6$ haloalkyl, $C_1$-$C_6$ alkoxy, or $C_1$-$C_6$ haloalkoxy. In some embodiments, Ar is pyridine, pyridazine, pyrimidine, pyrazine, or triazine; any of these may be unsubstituted or substituted.

In some embodiments, $R^4$ is hydrogen. In other embodiments, $R^4$ is $C_1$-$C_6$ alkyl. In still other embodiments, $R^4$ is methyl. In some embodiments, $R^4$ is ethyl. In some embodiments, $R^4$ is i-propyl. In some embodiments, $R^4$ is n-propyl.

In some embodiments, X is O; $R^1$ is optionally substituted phenyl; $R^2$ is chloro; and ===== indicates a single bond.

The compounds described herein contain three or more asymmetric centers and may thus give rise to enantiomers, diastereomers, and other stereoisomeric forms which may be defined in terms of absolute stereochemistry as (R)- or (S)-. The present invention is meant to include all such possible diastereomers as well as their racemic and optically pure forms. Optically active (R)- and (S)-isomers may be prepared using homo-chiral synthons or homo-chiral reagents, or optically resolved using conventional techniques. When the compounds described herein contain olefinic double bonds or other centers of geometric asymmetry, and unless specified otherwise, it is intended to include both (E)- and (Z)-geometric isomers. Likewise, all tautomeric forms are intended to be included.

The graphic representations of racemic, ambiscalemic and scalemic or enantiomerically pure compounds used herein are a modified version of the denotations taken from Maehr J. Chem. Ed. 62, 114-120 (1985): simple lines provide no information about stereochemistry and convey only connectivity; solid and broken wedges are used to denote the absolute configuration of a chiral element; solid and broken bold lines are geometric descriptors indicating the relative configuration shown but not necessarily denoting racemic character; and wedge outlines and dotted or broken lines denote enantiomerically pure compounds of indeterminate absolute configuration. For example, when $R^1$ is phenyl (that is, connected by a single bond), the graphic representation indicates either, or both, of the enantiomers below:

in any ratio, from pure enantiomers to racemates. The graphic representation:

indicates a single enantiomer of unknown absolute stereochemistry, i.e. it could be either of the two preceding structures, as a substantially pure single enantiomer.

For the purpose of the present disclosure, a "pure" or "substantially pure" enantiomer is intended to mean that the enantiomer is at least 95% of the configuration shown and 5% or less of other enantiomers. Similarly, a "pure" or "substantially pure" diastereomer is intended to mean that the diastereomer is at least 95% of the relative configuration shown and 5% or less of other diastereomers.

It may be found upon examination that certain species and genera are not patentable to the inventors in this application. In this case, the exclusion of species and genera in applicants' claims are to be considered artifacts of patent prosecution and not reflective of the inventors' concept or description of their invention, which encompasses all members of the genus that are not in the public's possession.

As used herein, and as would be understood by the person of skill in the art, the recitation of "a compound"—unless expressly further limited—is intended to include salts of that compound. In a particular embodiment, the term "compound of formula" refers to the compound or a pharmaceutically acceptable salt thereof.

The term "pharmaceutically acceptable salt" refers to salts prepared from pharmaceutically acceptable non-toxic acids or bases including inorganic acids and bases and organic acids and bases. When the compounds of the present invention are basic, salts may be prepared from pharmaceutically acceptable non-toxic acids including inorganic and organic acids. Suitable pharmaceutically acceptable acid addition salts for the compounds of the present invention include acetic, adipic, alginic, ascorbic, aspartic, benzenesulfonic (besylate), benzoic, boric, butyric, camphoric, camphorsulfonic, carbonic, citric, ethanedisulfonic, ethanesulfonic, ethylenediaminetetraacetic, formic, fumaric, glucoheptonic, gluconic, glutamic, hydrobromic, hydrochloric, hydroiodic, hydroxynaphthoic, isethionic, lactic, lactobionic, laurylsulfonic, maleic, malic, mandelic, methanesulfonic, mucic, naphthylenesulfonic, nitric, oleic, pamoic, pantothenic, phosphoric, pivalic, polygalacturonic, salicylic, stearic, succinic, sulfuric, tannic, tartaric acid, teoclatic, p-toluenesulfonic, and the like. When the compounds contain an acidic side chain, suitable pharmaceutically acceptable base addition salts for the compounds of the present invention include, but are not limited to, metallic salts made from aluminum, calcium, lithium, magnesium, potassium, sodium and zinc or organic salts made from lysine, arginine, N,N'-dibenzylethylenediamine, chloroprocaine, choline, diethanolamine, ethylenediamine, meglumine (N-methylglucamine) and procaine. Further pharmaceutically acceptable salts include, when appropriate, nontoxic ammonium cations and carboxylate, sulfonate and phosphonate anions attached to alkyl having from 1 to 20 carbon atoms.

Also provided herein is a pharmaceutical composition comprising a compound disclosed above, or a pharmaceutically acceptable salt form thereof, and a pharmaceutically acceptable carrier or diluent.

While it may be possible for the compounds of the formulae disclosed herein to be administered as the raw chemical, it is preferable to present them as a pharmaceutical composition. According to a further aspect, the present invention provides a pharmaceutical composition comprising a compound of formula I or a pharmaceutically acceptable salt thereof, together with one or more pharmaceutically carriers thereof and optionally one or more other therapeutic ingredients. The carrier(s) must be "acceptable" in the sense of being compatible with the other ingredients of the formulation and not deleterious to the recipient thereof.

The formulations include those suitable for oral, parenteral (including subcutaneous, intradermal, intramuscular, intravenous and intraarticular), rectal and topical (including dermal, buccal, sublingual and intraocular) administration. The most suitable route may depend upon the condition and disorder of the recipient. The formulations may conveniently be presented in unit dosage form and may be prepared by any of the methods well known in the art of pharmacy. All methods include the step of bringing into association a compound of formula I or a pharmaceutically acceptable salt thereof ("active ingredient") with the carrier which constitutes one or more accessory ingredients. In general, the formulations are prepared by uniformly and intimately bringing into association the active ingredient with liquid carriers or finely divided solid carriers or both and then, if necessary, shaping the product into the desired formulation.

Formulations of the present invention suitable for oral administration may be presented as discrete units such as capsules, cachets or tablets each containing a predetermined amount of the active ingredient; as a powder or granules; as a solution or a suspension in an aqueous liquid or a non-aqueous liquid; or as an oil-in-water liquid emulsion or a water-in-oil liquid emulsion. The active ingredient may also be presented as a bolus, electuary or paste.

A tablet may be made by compression or molding, optionally with one or more accessory ingredients. Compressed tablets may be prepared by compressing in a suitable machine the active ingredient in a free-flowing form such as a powder or granules, optionally mixed with a binder, lubricant, inert diluent, lubricating, surface active or dispersing agent. Molded tablets may be made by molding in a suitable machine a mixture of the powdered compound moistened with an inert liquid diluent. The tablets may optionally be coated or scored and may be formulated so as to provide sustained, delayed or controlled release of the active ingredient therein.

Formulations for parenteral administration include aqueous and non-aqueous sterile injection solutions which may contain anti-oxidants, buffers, bacteriostats and solutes which render the formulation isotonic with the blood of the intended recipient. Formulations for parenteral administration also include aqueous and non-aqueous sterile suspensions, which may include suspending agents and thickening agents. The formulations may be presented in unit-dose of multi-dose containers, for example sealed ampoules and vials, and may be stored in a freeze-dried (lyophilized) condition requiring only the addition of a sterile liquid carrier, for example saline, phosphate-buffered saline (PBS) or the like, immediately prior to use. Extemporaneous injection solutions and suspensions may be prepared from sterile powders, granules and tablets of the kind previously described.

It will be recognized that the compounds of this invention can exist in radiolabeled form, i.e., the compounds may contain one or more atoms containing an atomic mass or mass number different from the atomic mass or mass number usually found in nature. Radioisotopes of hydrogen, carbon, phosphorous, fluorine, and chlorine include $^2$H, $^3$H, $^{13}$C, $^{14}$C, $^{15}$N, $^{35}$S, $^{18}$F, and $^{36}$Cl, respectively. Compounds that contain those radioisotopes and/or other radioisotopes of other atoms are within the scope of this invention. Tritiated, i.e. $^3$H, and carbon-14, i.e., $^{14}$C, radioisotopes are particularly preferred for their ease in preparation and detectability. Compounds that contain isotopes $^{11}$C, $^{13}$N, $^{15}$O and $^{18}$F are well suited for positron emission tomography. Radiolabeled compounds of formula I of this invention and prodrugs thereof can generally be prepared by methods well known to those skilled in the art. Conveniently, such radiolabeled compounds can be prepared by carrying out the procedures disclosed in the Examples and Schemes by substituting a readily available radiolabeled reagent for a non-radiolabeled reagent.

Compounds and compositions of the invention are useful for the treatment of fibrosis and fibrotic diseases. Such fibrotic diseases include, but are not limited to, renal fibrosis, pulmonary fibrosis, cystic fibrosis, cirrhosis, fibrosis of the heart, mediastinal fibrosis, retroperitoneal cavity fibrosis, bone marrow fibrosis, hypertrophic scars, keloids, scleroderma, systemic sclerosis, Crohn's disease, Peyronie's disease, lupus nephritis, folic acid nephropathy, and fibrosis induced by radiation, infection, chemotherapeutic drugs, surgery, burns or inhalation.

Compounds and compositions of the invention are also useful for the treatment of chronic kidney disease, renal fibrosis, or chronic renal allograft injury.

Compounds and compositions of the invention are useful for the treatment of cancer. In some embodiments, the cancer is a solid malignancy. In some embodiments, the cancer is mediated by myeloid cells. In other embodiments, the cancer is mediated by B-cells. In some embodiments, the cancer is colon cancer. In other embodiments, the cancer is colorectal cancer. In other embodiments, the cancer is rectal cancer. In yet other embodiments, the cancer is stomach cancer. In still other embodiments, the cancer is breast cancer. In some embodiments, the cancer is triple-negative breast cancer. In some embodiments, the cancer is a hematological malignancy. In other embodiments, the cancer is chronic myeloid leukemia. In other embodiments, the cancer is acute lymphoblastic leukemia. In still other embodiments, the cancer is a myelodysplastic syndrome. In yet other embodiments, the cancer is multiple myeloma. In some embodiments, the cancer is a lymphoma. In other embodiments, the cancer is a B-cell lymphoma.

Compounds and compositions of the invention are useful for the treatment of an autoimmune or inflammatory disease. In some embodiments, the disease is rheumatoid arthritis. In other embodiments, the disease is chronic obstructive pulmonary disease.

Compounds and compositions of the invention are useful for the treatment of a disease or disorder caused by a virus. In some embodiments, the disease is HIV/AIDS.

Compounds and compositions of the invention are useful for treating diseases or disorders that involve the dysregulation of hematopoietic cell kinase (HCK) signaling.

ABBREVIATIONS AND DEFINITIONS

Unless defined otherwise, all technical and scientific terms used herein have the same meaning as is commonly understood by one of ordinary skill in the art to which this disclosure belongs. A comprehensive list of abbreviations utilized by organic chemists (i.e. persons of ordinary skill in the art) appears in the first issue of each volume of the *Journal of Organic Chemistry*. The list, which is typically presented in a table entitled "Standard List of Abbreviations" is incorporated herein by reference. In the event that there is a plurality of definitions for terms cited herein, those in this section prevail unless otherwise stated.

The following abbreviations and terms have the indicated meanings throughout:

Ac=acetyl
Aq=aqueous
Boc=t-butyloxy carbonyl
Bu=butyl
c-=cyclo
DCM=dichloromethane=methylene chloride=$CH_2Cl_2$
DMAP=4-Dimethylaminopyridine
DMF=N,N-dimethylformamide
eq. or equiv.=equivalent(s)
Et=ethyl
GC=gas chromatography
h=hour(s)
Me=methyl
mesyl=methanesulfonyl
min.=minute(s)
MS (4A)=Molecular sieves (4 Å ngstrom pore size)
Pg=protecting group
Ph=phenyl
RT or rt=room temperature
sat'd or sat.=saturated
t- or tert=tertiary
TMS=Tetramethylsilane
tosyl=p-toluenesulfonyl As used herein, the terms "comprising" and "including" or grammatical variants thereof are to be taken as specifying the stated features, integers, steps or components but do not preclude the addition of one or more additional features, integers, steps, components or groups thereof. This term encompasses the terms "consisting of" and "consisting essentially of".

The phrase "consisting essentially of" or grammatical variants thereof when used herein are to be taken as specifying the stated features, integers, steps or components but do not preclude the addition of one or more additional features, integers, steps, components or groups thereof, but only if the additional features, integers, steps, components or groups thereof do not materially alter the basic and novel characteristics of the claimed composition or method.

A "patient," as used herein, includes both humans and other animals, particularly mammals. Thus, the methods are applicable to both human therapy and veterinary applications. In some embodiments, the patient is a mammal, for example, a primate. In some embodiments, the patient is a human.

Treatment can involve administering a compound described herein to a patient diagnosed with a disease and may involve administering the compound to a patient who does not have active symptoms. Conversely, treatment may involve administering the compositions to a patient at risk of developing a particular disease, or to a patient reporting one or more of the physiological symptoms of a disease, even though a diagnosis of this disease may not have been made.

The terms "administer", "administering" or "administration" in reference to a dosage form of the invention refers to the act of introducing the dosage form into the system of subject in need of treatment. When a dosage form of the invention is given in combination with one or more other active agents (in their respective dosage forms), "administration" and its variants are each understood to include concurrent and/or sequential introduction of the dosage form and the other active agents. Administration of any of the described dosage forms includes parallel administration, co-administration or sequential administration. In some situations, the therapies are administered at approximately the same time, e.g., within about a few seconds to a few hours of one another.

A "therapeutically effective" amount of a compound described herein is typically one which is sufficient to achieve the desired effect and may vary according to the nature and severity of the disease condition, and the potency of the compound. It will be appreciated that different concentrations may be employed for prophylaxis than for treatment of an active disease. A therapeutic benefit is achieved with the amelioration of one or more of the physiological symptoms associated with the underlying disorder such that an improvement is observed in the patient, notwithstanding that the patient may still be afflicted with the underlying disorder.

Throughout this specification the terms and substituents retain their definitions.

Unless otherwise specified, alkyl (or alkylene) is intended to include linear, branched, or cyclic saturated hydrocarbon structures and combinations thereof. A combination would be, for example, cyclopropylmethyl. Unless otherwise specified, alkyl refers to alkyl groups from 1 to 20 carbon atoms, in some instances 1 to 10 carbon atoms, in some instances 1 to 6 carbon atoms, in some instances 1 to 4 carbon atoms, and in some instances 1 to 3 carbon atoms. Examples of alkyl groups include methyl, ethyl, propyl, isopropyl, cyclopropyl, n-butyl, s-butyl, t-butyl and the like. Cycloalkyl is a subset of alkyl and includes cyclic hydrocarbon groups of from 3 to 8 carbon atoms and, in some instances, from 3 to 6 carbon atoms. Examples of cycloalkyl groups include c-propyl, c-butyl, c-pentyl, norbornyl and the like.

Heterocycle means a cycloalkyl or aryl carbocycle residue in which from one to four carbons is replaced by a heteroatom selected from the group consisting of N, O and S. The nitrogen and sulfur heteroatoms may optionally be oxidized, and the nitrogen heteroatom may optionally be quaternized.

Unless otherwise specified, a heterocycle may be non-aromatic or aromatic. Examples of heterocycles that fall within the scope of the invention include pyrrolidine, piperidine, piperazine, azepane, pyrazole, pyrrole, indole, quinoline, isoquinoline, tetrahydroisoquinoline, benzofuran, benzodioxan, benzodioxole (commonly referred to as methylenedioxyphenyl, when occurring as a substituent), tetrazole, morpholine, thiazole, pyridine, pyridazine, pyrimidine, thiophene, furan, oxazole, oxazoline, isoxazole, dioxane, tetrahydrofuran and the like. Examples of heterocyclyl residues additionally include piperazinyl, 2-oxopiperazinyl, 2-oxopiperidinyl, 2-oxo-pyrrolidinyl, 2-oxoazepinyl, azepinyl, 4-piperidinyl, pyrazolidinyl, imidazolyl, imidazolinyl, imidazolidinyl, pyrazinyl, oxazolidinyl, isoxazolidinyl, thiazolidinyl, isothiazolyl, quinuclidinyl, isothiazolidinyl, benzimidazolyl, thiadiazolyl, benzopyranyl, benzothiazolyl, tetrahydrofuryl, tetrahydropyranyl, thienyl, benzothienyl, thiamorpholinyl, thiamorpholinylsulfoxide, thiamorpholinylsulfone, oxadiazolyl, triazolyl and tetrahydroquinolinyl.

Heteroaryl is a subset of heterocycle in which the heterocycle is aromatic. In some instances, the heteroaryl contains five or six ring members. Examples of these include isoxazole, oxazole, thiazole, furan, pyrazole, thiophene, triazole, pyrrole, imidazole, isothiazole, oxadiazole, triazole, thiadiazole, pyridine, pyridazine, pyrimidine, pyrazine, and triazine, and the like. In some instances, heteroaryl may include isoxazole, oxazole, imidazole, and pyrazole.

Alkoxy or alkoxyl refers to groups of from 1 to 20 carbon atoms, preferably 1 to 10 carbon atoms, more preferably 1 to 6 carbon atoms of a straight or branched configuration attached to the parent structure through an oxygen. Examples include methoxy, ethoxy, propoxy, isopropoxy and the like. Lower-alkoxy refers to groups containing one to four carbons. For the purpose of this application, alkoxy and lower alkoxy include methylenedioxy and ethylenedioxy.

The term "halogen" means fluorine, chlorine, bromine or iodine atoms. In one embodiment, halogen may be a fluorine or chlorine atom.

The terms "haloalkyl" and "haloalkoxy" mean alkyl or alkoxy, respectively, substituted with one or more halogen atoms.

Amidoxime refers to groups with the structure $R^A C(=NOH)NR^B R^C$. In some embodiments, at least one of $R^B$ and $R^C$ is hydrogen. In some embodiments, both $R^B$ and $R^C$ are hydrogen.

As used herein, the term "optionally substituted" may be used interchangeably with "unsubstituted or substituted". The term "substituted" refers to the replacement of one or more hydrogen atoms in a specified group with a specified radical. For example, unless otherwise specified, substituted alkyl, aryl, cycloalkyl, heterocyclyl, etc. refer to alkyl, aryl, cycloalkyl, or heterocyclyl wherein one or more H atoms in each residue are replaced with halogen, haloalkyl, alkyl, acyl, alkoxyalkyl, hydroxy lower alkyl, carbonyl, phenyl, heteroaryl, benzenesulfonyl, hydroxy, lower alkoxy, haloalkoxy, oxaalkyl, carboxy, alkoxycarbonyl [—C(=O)O-alkyl], alkoxycarbonylamino [HNC(=O)O-alkyl], aminocarbonyl (also known as carboxamido) [—C(=O)NH$_2$], alkylaminocarbonyl [—C(=O)NH-alkyl], cyano, acetoxy, nitro, amino, alkylamino, dialkylamino, (alkyl)(aryl)aminoalkyl, alkylaminoalkyl (including cycloalkylaminoalkyl), dialkylaminoalkyl, dialkylaminoalkoxy, heterocyclylalkoxy, mercapto, alkylthio, sulfoxide, sulfone, sulfonylamino, alkylsulfinyl, alkylsulfonyl, acylaminoalkyl, acylaminoalkoxy, acylamino, amidino, aryl, benzyl, heterocyclyl, heterocyclylalkyl, phenoxy, benzyloxy, heteroaryloxy, hydroxyimino, alkoxyimino, oxaalkyl, aminosulfonyl, trityl, amidino, guanidino, ureido, benzyloxyphenyl, and benzyloxy. "Oxo" is also included among the substituents referred to in "optionally substituted"; it will be appreciated by persons of skill in the art that, because oxo is a divalent radical, there are circumstances in which it will not be appropriate as a substituent (e.g. on phenyl). In one embodiment, 1, 2, or 3 hydrogen atoms are replaced with a specified radical. In the case of alkyl and cycloalkyl, more than three hydrogen atoms can be replaced by fluorine; indeed, all available hydrogen atoms could be replaced by fluorine. In some embodiments, substituents are halogen, haloalkyl, alkyl, acyl, hydroxyalkyl, hydroxy, alkoxy, haloalkoxy, aminocarbonyl oxaalkyl, carboxy, cyano, acetoxy, nitro, amino, alkylamino, dialkylamino, alkylthio, alkylsulfinyl, alkylsulfonyl, alkylsulfonylamino arylsulfonyl, arylsulfonylamino, and benzyloxy.

EXAMPLES

TABLE

| Example No. | Structure |
|---|---|
| 1 |  |
| 2 |  |
| 3 |  |

Preparation of compounds can involve the protection and deprotection of various chemical groups. The need for protection and deprotection, and the selection of appropriate protecting groups, can be readily determined by one skilled in the art. Suitable groups for that purpose are discussed in standard textbooks in the field of chemistry, such as Protective Groups in Organic Synthesis by T. W. Greene and P. G. M. Wuts [John Wiley & Sons, New York, 1999], in *Protecting Group Chemistry*, 1$^{st}$ Ed., Oxford University Press, 2000; and in *March's Advanced Organic chemistry: Reactions, Mechanisms, and Structure*, 5$^{th}$ Ed., Wiley-Interscience Publication, 2001.

Many compounds described herein may be prepared by the schemes below.

General Information: All reagents were purchased from commercial sources and used without treatment, unless otherwise indicated. The products were purified by column chromatography over silica gel. $^1H$ NMR and $^{13}C$ NMR spectra were recorded at 25° C. at 600 MHz and 125 MHz, respectively, with TMS as internal standard. Abbreviations for signal coupling are as follows: s, singlet; d, doublet; t, triplet; q, quartet; m, multiplet; br, broad. Column chromatography was performed using $SiO_2$ (0.060-0.2 mm, 70-230 mesh) from Alfa Aeser. All reagents were obtained from commercial sources. Mass spectra were recorded on Varian MS mass spectrometer.

General Procedure 1

Carbonitrile compounds (B): These compounds are prepared by adding Triflic acid (3 mmol), a well-stirred solution of aldehyde A (1 mmol), and sodium azide (1.5 mmol) in $CH_3CN$ (10 mL) and stirring the mixture at room temperature for 24 hrs; the reaction is monitored through TLC. After removal of the solvent under reduced pressure, the residue is extracted with EtOAc (3×15 mL), and the combined organic extract is washed with water, dried over anhydrous $Na_2SO_4$, and purified by silica gel column (EtOAc: pet ether; 1:10), resulting in B.

General Procedure 2

Amidoxime compounds (C): A solution of appropriate carbonitrile B (10 mmol), $Na_2CO_3$ (10 mmol) in ethanol (10 ml) is heated at 80° C.; to this, hydroxylamine hydrochloride (10 mmol) is added and stirred for 3 hrs. Then an additional amount of hydroxylamine (10 mmol) and $Na_2CO_3$ (10 mmol) are added, and the stirring is continued for 12 hrs. After completion of the reaction, solid precipitate is isolated through filtration. This residue is further purified by silica gel chromatography (EtOAc: pet ether; 1:5) to obtain the product C.

General Procedure 3

Compounds of Formula I: A solution of Compound C (1 mmol), a boronic acid (D), and MS (4°A) in Toluene is heated at 110° C. The reaction is stirred for 12-20 hrs with TLC monitoring. After completion of the reaction, the solid precipitate is isolated through filtration, and the residue is further purified by silica gel chromatography to obtain the pure product (EtOAc: pet ether; 1:20).

Procedure 4 for the Synthesis of Carbonitrile Compound b 6,8-dichloro-2-phenyl-2H-chromene-3-carbonitrile (Compound b): The compound was prepared by adding Triflic acid (3 mmol) to a well-stirred solution of 6,8- dichloro-2-phenyl-2H-chromene-3-carbaldehyde (Compound a) (1 mmol), sodium azide (1.5 mmol) in CH₃CN (10 mL), and the mixture was stirred at room temperature for 24 hrs; the reaction was monitored through TLC. After removal of the solvent under reduced pressure, the residue was extracted with EtOAc (3×15 mL), and the combined organic extract was washed with water, dried over anhydrous Na₂SO₄, and purified by silica gel column (EtOAc: pet ether; 1:10). A yellow solid (54%). ¹H NMR (600 MHz, CDCl₃), δ: 7.45 (m, 2H), 7.41 (m, 3H), 7.32 (d, J=8.26 Hz, 1H), 7.23 (s, 1H), 7.05 (d, J=6.6 Hz, 1H), 6.049 (s, 1H); ¹³C NMR (CDCl₃, 125 MHz) δ: 147.6, 136.3, 136.2, 132.6, 129.7, 129.1, 129.0, 127.0, 126.8, 126.1, 123.1, 121.2, 116.0, 109.2, 77.2. LC-MS (EI) Calcd. for $C_{16}H_9Cl_2NO$ [M+Na]⁺ requires 323.9886, found 322.0137.

Procedure 5 for the Synthesis of Amidoxime Compound c (E)-6,8-dichloro-N'-hydroxy-2-phenyl-2H-chromene-3-carboximidamide (Compound c): A solution of Compound b (10 mmol), Na₂CO₃ (10 mmol) in ethanol (10 ml) was heated at 80° C.; to this hydroxylamine hydrochloride (10 mmol) was added and stirred for 3 hrs. Then hydroxyl amine (10 mmol) and Na₂CO₃ (10 mmol) were added, and the stirring was continued for 12 hrs. After completion of the reaction, solid precipitate was isolated through filtration. This residue was further purified by silica gel chromatography (EtOAc: pet ether; 1:5) to obtain the product, Compound c. A white solid (900 mg, 36%). ¹H NMR (CDCl₃, 600 MHz) δ9.59 (s, 1H), 7.84 (d, J=1.8 Hz, 1H), 7.65 (dd, J₁,₂=8.4, 1.8 Hz, 1H), 7.28-7.34 (m, 6H), 7.15 (d, J=9.0 Hz, 1H), 6.65 (m, 2H), 6.47 (d, J=7.2 Hz, 1H); ¹³C NMR (DMSO, 150 MHz) δ; 159.5, 158.2, 133.2, 132.8, 132.4, 130.4, 130.1, 129.8, 129.6, 129.4, 129.1, 118.8, 113.1, 111.3, 57.4. HRMS (EI) Calcd. for $C_{16}H_{12}Cl_2N_2O_2$ [M]⁺ requires 334.0276, found 334.0333.

Procedure 6 for the Synthesis of Example 1

Example 1

A solution of Compound c (1 mmol), pyridin-3-ylboronic acid (d1) (1.2 mmol) and MS (4 A, 100 mg) in Toluene (5 ml) was heated at 110° C. The reaction was stirred for 12 hrs with TLC monitoring. After completion of the reaction, solid precipitate was isolated through filtration. This residue was further purified by silica gel chromatography to obtain the pure product (EtOAc: pet ether; 1:20), Example 1. A white solid (75%). 1H NMR (DMSO-d6, 500 MHz) δ9.3 (d, J=1.8 Hz, 1H), 8.8 (d, J=1.8 Hz, 1H), 8.6 (d, J=1.8 Hz, 1H), 8.19 (d, J=1.8 Hz, 1H), 7.9-8.01 (m, 6H), 7.89 (m, 1H), 7.66-7.73 (m, 2H), 7.54-7.57 (m, 2H), 6.39 (m, 1H); 13C NMR (CDCl3, 125 MHz) δ; 149.5, 147.4, 138.0, 137.8, 129.9, 129.0, 128.8, 128.5, 128.3, 128.2, 127.1, 126.1, 125.2, 124.4, 123.9, 123.7, 122.6, 120.5, 74.9; HRMS (EI) Calcd. for C21H14BCl2N3O2 [M+H]+requires 422.0634, found 422.9587.

Procedure 7 for the Synthesis of Example 2

Example 2

Procedure for the synthesis of 3-(6, 8-dichloro-2-phenyl-2H-chromen-3-yl)-5-phenyl-4, 5-dihydro-1, 2, 4, 5-oxadiazaborole (Example 2): A clean oven dried 10 mL round bottom flask was charged with c (0.5 mmol), phenylboronic acid (d2) (0.6 mmol), and dissolved in toluene (3 mL). The reaction mixture was refluxed for 20 h in the presence of MS (4A). Reaction progress was monitored by TLC. After completion of the reaction, toluene was evaporated and reaction mixture was diluted with acetone. After extracting with acetone and filtration, the filtrate was concentrated under reduce pressure. The residue was crystalized by ethyl acetate-petroleum ether (1:4) mixture to obtain pure product. Example 2: $^1$H NMR (500 MHz, DMSO-$d_6$) δ10.57 (s, 1H), 8.00 (s, 1H), 7.87 (d, J=7.6 Hz, 1H), 7.79 (d, J=7.1 Hz, 1H), 7.70 (s, 1H), 7.56-7.49 (m, 3H), 7.42-7.32 (m, 6H), 6.61 (s, 1H).

Procedure 8 for the Synthesis of Example 3

Example 3

A solution of Compound c (1 mmol), (2-aminothiazol-5-yl)boronic acid (d3) (1.2 mmol) and MS (4A, 100 mg) in Toluene (5 ml) was heated at 110° C. The reaction was stirred for 12 hrs with TLC monitoring. After completion of the reaction, solid precipitate was isolated through filtration. This residue was further purified by silica gel chromatography to obtain the pure product Example 3 (EtOAc: pet ether; 1:20). A yellowish white solid (78%). $^1$H NMR (DMSO-d6, 500 MHz) δ9.3 (d, J=1.8 Hz, 1H), 8.8 (d, J=1.8 Hz, 1H), 8.6 (d, J=1.8 Hz, 1H), 8.19 (d, J=1.8 Hz, 1H), 7.9-8.01 (m, 6H), 7.89 (m, 1H), 7.66-7.73 (m, 2H), 7.54-7.57 (m, 2H), 6.39 (m, 1H); $^{13}$C NMR (CDCl$_3$, 125 MHz) δ; 168.9 165.1, 158.6, 143.3, 139.3, 133.6, 133.0, 132.5, 132.5, 132.0, 131.9, 129.2, 129.2, 128.7, 126.4, 119.2, 117.4; 108.21.

ASSAYS AND RESULTS

HCK activity inhibition efficiency for the inhibitors. Inhibiting efficiency is performed in Reaction Biology with Corp P32 radioactive kinase assay, comparing compounds of the invention with dasatinib for HCK, Bcr-Abl and other binding kinases identified in the reference. Briefly, HCK kinase was delivered into the substrate solution and gently mixed, then compounds in DMSO were added into the kinase reaction mixture by Acoustic technology (Echo550; Nano liter range), and incubated for 20 minutes at room temperature. 33P-ATP was delivered into the reaction mixture to initiate the reaction. The kinase reaction was incubated for 2 hours at room temperature. Reactions were spotted onto P81 ion exchange paper, and detected kinase activity was measured by filter-binding method. Example 2 exhibits an IC$_{50}$ for HCK activity of about 12 μM. In addition, in other tests not described herein, Example 2 reduced the mRNA expression of COL1A1, SNAIL and FN1 in HK2 cells and SMAD3 transcriptional activity in HEK293 cells, confirming its potential anti-fibrosis effect.

Inhibiting Hck activity in vivo with Example 2 attenuates kidney fibrosis in murine UUO model: Unilateral ureteral obstruction (UUO) was performed on Male C57BL/6 mice (~10 weeks age). Mice were perfused 7-days post UUO. The inhibitory activity of the compounds of the invention as compared to controls was determined. The UUO mice were treated with Example 2 at 25 mg/kg or vehicle (n=5) by gavage daily started one day prior to the surgery to 7-days post-surgery. The expression of Col1a1, Fibronectin and FSP-1 were significantly decreased in the UUO kidney of mice treated with Example 2, compared with the vehicle-treated mice. Hematoxylin and eosin (H&E) staining showed that treatment with Example 2 reduced RTEC injury in the UUO kidney as compared to the vehicle-treated mice. Masson and collagen I staining confirmed that treatment with Example 2 reduced renal fibrosis in the UUO kidneys. Compounds of the invention are promising HCK-specific inhibitors.

Figure 1:
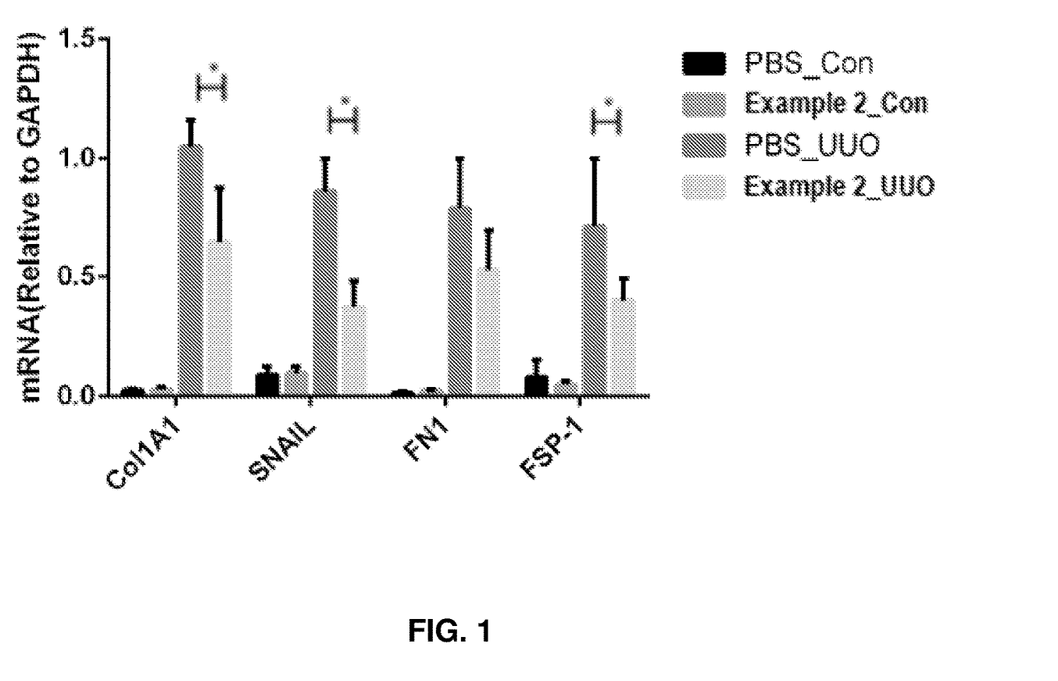
FIG. 1 depicts mRNA—levels of pro-fibrotic markers at 7-days post-UUO by RT-PCR (normalized to GAPDH), from whole cortices of control and UUO kidneys of animals fed a compound of the invention and PBS-fed animals.
Figure 2:
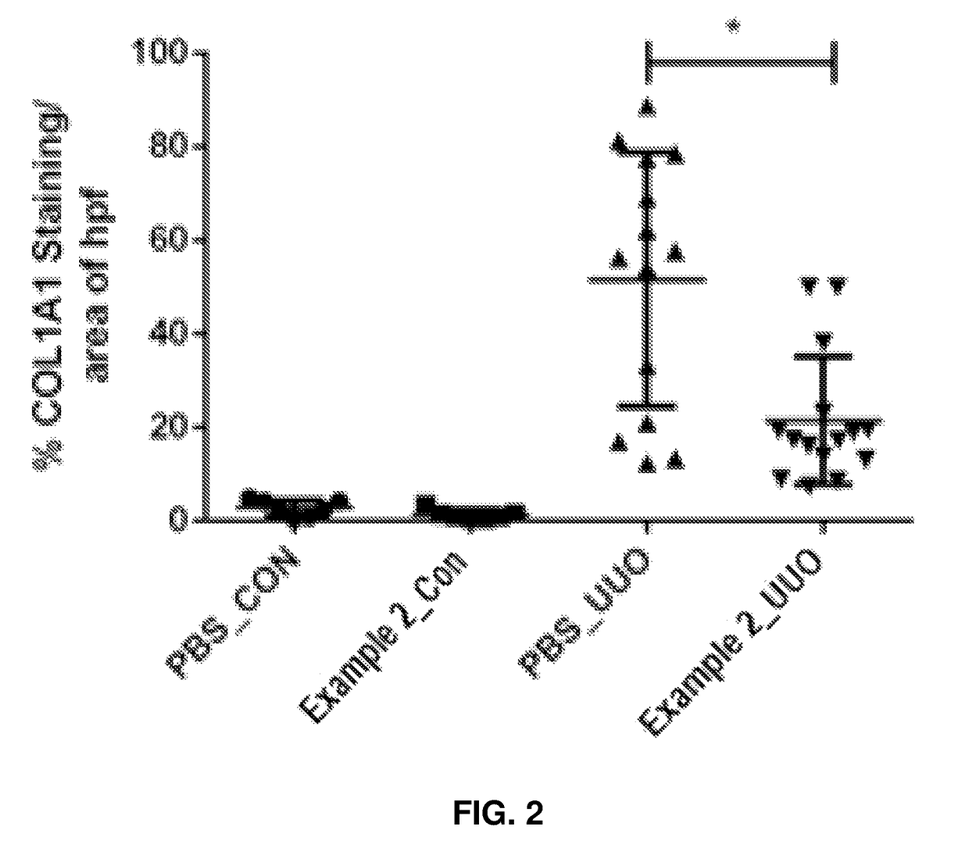
FIG. 2 shows morphometric quantification of thresh-holded 40×images.

FIG. 1 depicts mRNA—levels of pro-fibrotic markers at 7-days post-UUO by RT-PCR (normalized to GAPDH), from whole cortices of control and UUO kidneys of Example 2 and PBS-fed animals. FIG. 2: Morphometric quantification of threshholded 40×images from control (PBS) control & UUO-kidneys of PBS- and Example 2-gavaged mice at 7-days post-UUO (n=3 animals; 5 random hpfs/animal); the graph shows the area of COL1A1 IF as a percentage of total hpf area. Values are mean±SEM. *P<0.05.

Figure 3:
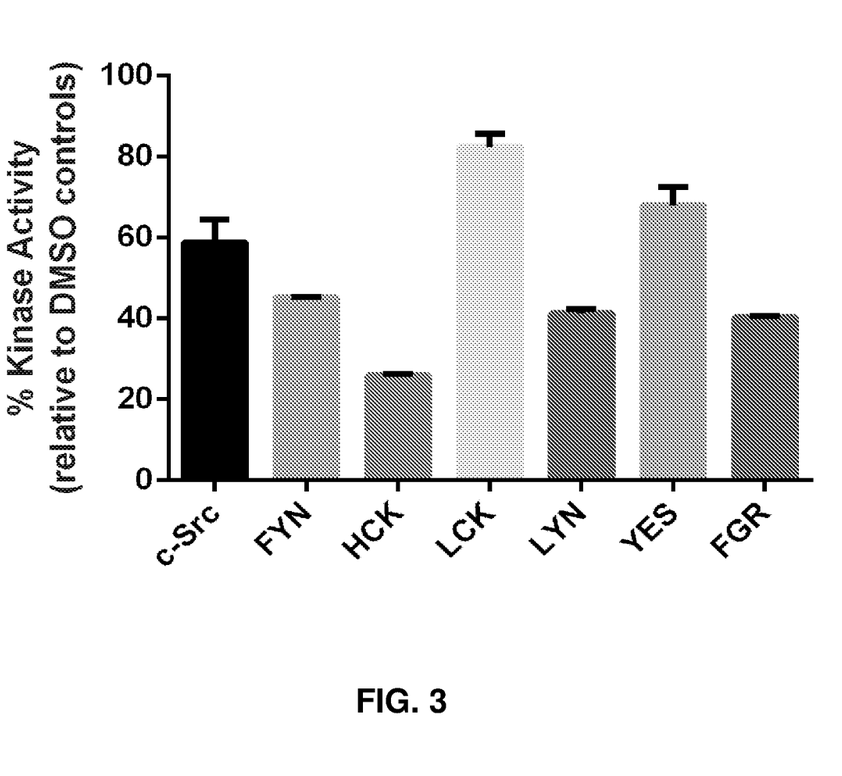
FIG. 3 the inhibition of a compound of the invention to all Src-family kinase (SFK) activity.
Figure 4:
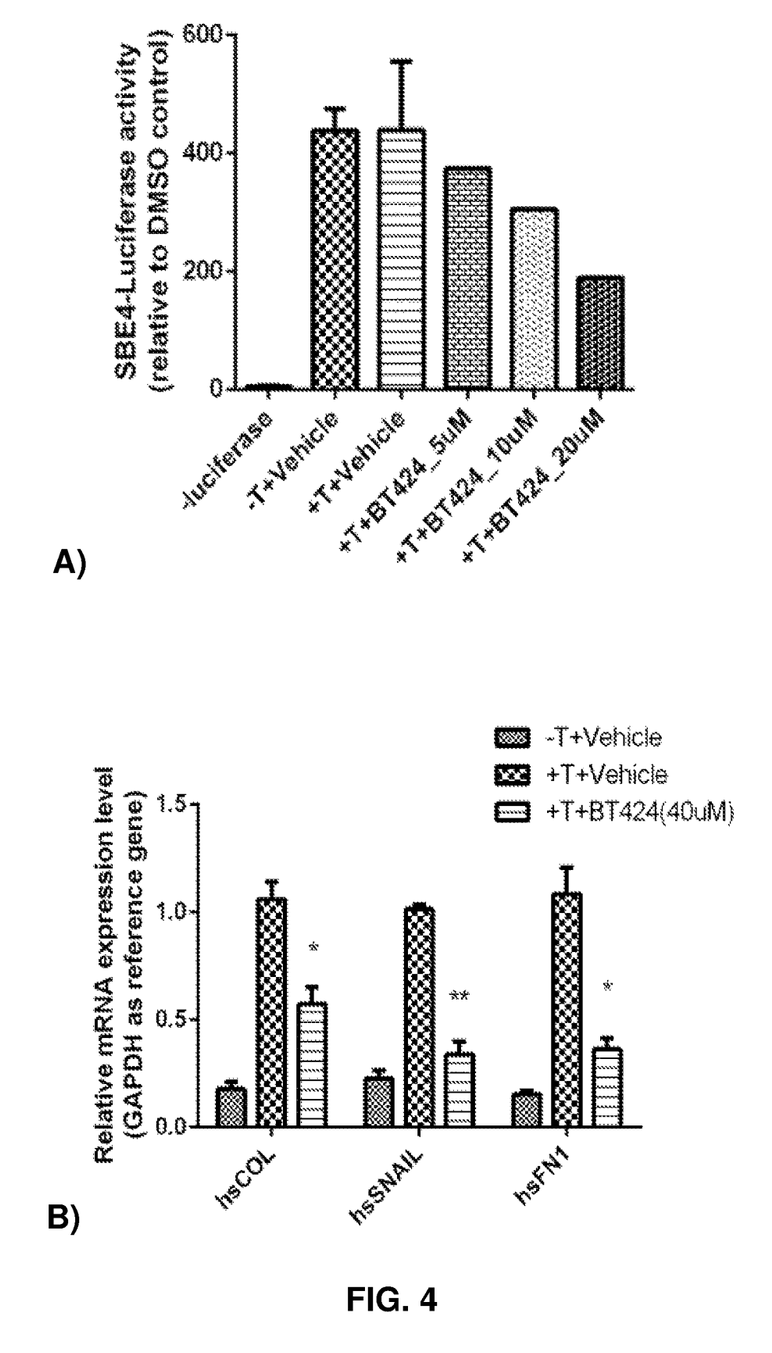
FIG. 4 demonstrates the mRNA expression of fibrosis markers and SMAD3 transcriptional activity (A) and potential anti-fibrosis effect (B) of a compound of the invention.

Example 2 had an IC50 of less than 20 uM and, when tested for the inhibition of all Src-family kinase (SFK)

activity, showed selectivity to HCK inhibition (FIG. 3), with no cytotoxicity at 50 uM (data not shown). In addition, as shown in FIG. 4, Example 2 (referred to as "BT-424") reduced the mRNA expression of fibrosis markers and SMAD3 transcriptional activity (A), confirming its potential anti-fibrosis effect (B).

Assays to measure kidney fibrosis level and kidney functions in various animal models (for instance, but not limited to, MRL-lpr lupus mice (for lupus) and folic acid (FA) induced AKI model (for folic acid nephropathy)):

Measurements of Serum Creatinine: Serum creatinine is measured by an HPLC-based method. Five microliters of serum per mouse is processed as described and then assayed using a Shimadzu Prominence HPLC unit (Columbia, MD) connected with a cation exchange column (PRP-X200; Hamilton Co., Reno, NV). Urine Albumin and Creatinine: Urine creatinine is quantified using commercial kits from BioAssay Systems (Hayward, CA). Urine albumin can be determined using a commercial assay from Bethyl Laboratory Inc. (Houston, TX). Urine albumin excretion is expressed as the ratio of urine albumin to creatinine. Transmission Electron Microscopy: Mice are perfused with phosphate-buffered saline and then immediately fixed in glutaraldehyde. Sections are mounted on a copper grid and photographed under a Hitachi H7650 microscope. Kidney Histology: Kidney samples are fixed in 10% formalin, embedded in paraffin, and sectioned to 4-mm thickness. Periodic acid-Schiff—stained sections are used to assess kidney histologic features. Renal histologic abnormalities are scored. The glomerular parameters scored include the percentage of glomeruli exhibiting segmental or global sclerosis, the severity of mesangial expansion (graded on a semi-quantitative scale from 0 to 3+), and the severity of podocyte hyperplasia (graded on a semi-quantitative scale from 0 to 3+). For the latter parameter, podocyte hyperplasia is graded as 0 (absent), 1+ (involving 1%-25% of all glomeruli sampled), 2+ (involving 26%-50% of glomeruli), and 3+ (involving 50% of glomeruli). For the evaluation of the tubulointerstitial compartment, the percentage of total renal parenchyma occupied by tubular casts and/or microcysts as well as the severity of interstitial inflammation (graded on a semi-quantitative scale from 0 to 3+) is assessed. For the latter parameter, interstitial inflammation is graded as 0 (absent), 1+ (involving 1%-25% of the cortical parenchyma), 2+ (involving 25%-50%), and 3+ (involving. 50%). Frozen sections are used for immunofluorescence staining for nephrin, podocin, synaptopodin, and WT-1, and images can be taken by using a Zeiss Axioplan 2 IE microscope.

Various embodiments of the invention can be described in the text below:

[1]. A compound of formula I:

I wherein
X is selected from O, $NR^3$, and S;
$R^1$ is selected from O and phenyl optionally substituted with one or more substituents selected from $C_1$-$C_6$ alkyl, $C_1$-$C_6$ alkoxy, $C_1$-$C_6$ fluoroalkyl, and halogen;
$R^2$ is selected from halogen, hydrogen, $C_1$-$C_6$ alkyl, $C_1$-$C_3$ alkoxy, $C_1$-$C_3$ fluoroalkyl, and phenyl;
$R^3$ is selected from hydrogen and $C_1$-$C_6$ alkyl;
Ar is selected from phenyl, a 5-membered heteroaryl, and a 6-membered heteroaryl, wherein said phenyl, 5-membered heteroaryl, or 6-membered heteroaryl is optionally substituted with amino, cyano, halogen, hydroxy, —C(O)NH$_2$, —C(=O)OR$^4$, $C_1$-$C_6$ alkyl, $C_1$-$C_6$ haloalkyl, $C_1$-$C_6$ alkoxy, or $C_1$-$C_6$ haloalkoxy;
$R^4$ is selected from hydrogen and $C_1$-$C_6$ alkyl; and
------ indicates a single bond or a double bond.

[2]. A compound of [1] above, or according to other embodiments of the invention, wherein X is O.

[3]. A compound of [1] above, or according to other embodiments of the invention, wherein X is S.

[4]. A compound of [1] above, or according to other embodiments of the invention, wherein X is $NR^3$.

[5]. A compound of [1] or [4] above, or according to other embodiments of the invention, wherein $R^3$ is hydrogen or methyl.

[6]. A compound of [1], [4] or [5] above, or according to other embodiments of the invention, wherein $R^3$ is hydrogen.

[7]. A compound of [1], [2], [3], [4], [5], or [6] above, or according to other embodiments of the invention, wherein $R^1$ is optionally substituted phenyl and ------ is a single bond.

[8]. A compound of [1], [2], [3], [4], [5], [6], or [7] above, or according to other embodiments of the invention, wherein ------ is a single bond and $R^1$ is unsubstituted phenyl.

[9]. A compound of [1], [2], [3], [4], [5], or [6] above, or according to other embodiments of the invention, wherein $R^1$ is O and ------ is a double bond.

[10]. A compound of any of [1] to [9] above, or according to other embodiments of the invention, wherein $R^2$ is halogen.

[11]. A compound of any of [1] to [10] above, or according to other embodiments of the invention, wherein $R^2$ is chloro.

[12]. A compound of any of [1] to [9] above, or according to other embodiments of the invention, wherein $R^2$ is hydrogen.

[13]. A compound of any of [1] to [12] above, or according to other embodiments of the invention, wherein Ar is phenyl optionally substituted with amino, cyano, halogen, hydroxy, —C(O)NH$_2$, —C(=O)OR$^4$, $C_1$-$C_6$ alkyl, $C_1$-$C_6$ haloalkyl, $C_1$-$C_6$ alkoxy, or $C_1$-$C_6$ haloalkoxy.

[14]. A compound of any of [1] to [13] above, or according to other embodiments of the invention, wherein Ar is unsubstituted phenyl.

[15]. A compound of any of [1] to [12] above, or according to other embodiments of the invention, wherein Ar is a 5-membered heteroaryl optionally substituted with amino, cyano, halogen, hydroxy, —C(O)NH$_2$, —C(=O)OR$^4$, $C_1$-$C_6$ alkyl, $C_1$-$C_6$ haloalkyl, $C_1$-$C_6$ alkoxy, or $C_1$-$C_6$ haloalkoxy.

[16]. A compound of any of [1] to [12] or [15] above, or according to other embodiments of the invention, wherein Ar is selected from isoxazole, oxazole, thiazole, furan, pyrazole, thiophene, triazole, pyrrole, imidazole, isothiazole, oxadiazole, triazole, and thiadiazole, each of which is optionally substituted.

[17]. A compound of any of [1] to [12], [15] or [16] above, or according to other embodiments of the invention, wherein Ar is an unsubstituted 5-membered heteroaryl.

[18]. A compound of any of [1] to [12] above, or according to other embodiments of the invention, wherein Ar is a 6-membered heteroaryl optionally substituted with amino, cyano, halogen, hydroxy, —C(O)NH$_2$, —C(=O)OR$^4$, C$_1$-C$_6$ alkyl, C$_1$-C$_6$ haloalkyl, C$_1$-C$_6$ alkoxy, or C$_1$-C$_6$ haloalkoxy.

[19]. A compound of any of [1] to [12] or [18] above, or according to other embodiments of the invention, wherein Ar is selected from pyridine, pyridazine, pyrimidine, pyrazine, and triazine, each of which is optionally substituted.

[20]. A compound of any of [1] to [12], [18] or [19] above, or according to other embodiments of the invention, wherein Ar is an unsubstituted 6-membered heteroaryl.

[21]. A compound of any of [1] to [13], [15], [16], [18] or [19] above, or according to other embodiments of the invention, wherein R$^4$ is hydrogen.

[22]. A compound of [1] above, or according to other embodiments of the invention, wherein X is O; R$^1$ is optionally substituted phenyl; R$^2$ is chloro; and ------ indicates a single bond.

[23]. A pharmaceutical composition comprising a pharmaceutically acceptable carrier and a compound of any one of [1] to [22] above, or according to other embodiments of the invention.

[24]. A method for treating fibrosis or a fibrotic disease in a patient, the method comprising administering to a patient an effective amount of a compound according to any one of [1] to [22] above, or an effective amount of a pharmaceutical composition of [23], or according to other embodiments of the invention.

[25]. The method of [24] above, or according to other embodiments of the invention, wherein the fibrosis or fibrotic disease is selected from renal fibrosis, pulmonary fibrosis, cystic fibrosis, cirrhosis, fibrosis of the heart, mediastinal fibrosis, retroperitoneal cavity fibrosis, bone marrow fibrosis, hypertrophic scars, keloids, scleroderma, systemic sclerosis, Crohn's disease, Peyronie's disease, lupus nephritis, folic acid nephropathy, and fibrosis induced by radiation, infection, chemotherapeutic drugs, surgery, burns or inhalation.

[26]. A method for treating a chronic kidney disease, renal fibrosis, or chronic renal allograft injury in a patient, the method comprising administering to a patient an effective amount of a compound according to any one of [1] to [22] above, or an effective amount of a pharmaceutical composition of [23], or according to other embodiments of the invention.

[27]. A method for treating a disease or disorder in a patient chosen from solid malignancy and hematological malignancy, the method comprising administering to a patient an effective amount of a compound according to any one of [1] to [22] above, or an effective amount of a pharmaceutical composition of [23], or according to other embodiments of the invention.

[28]. The method of [27] above, or according to other embodiments of the invention, wherein the disease or disorder is breast cancer, colon cancer, rectal cancer, or stomach cancer.

[29]. The method of [27] above, or according to other embodiments of the invention, wherein the disease or disorder is chronic myeloid leukemia, acute lymphoblastic leukemia, a myelodysplastic syndrome, multiple myeloma or a lymphoma.

[30]. A method for treating a disease or disorder in a patient chosen from an autoimmune or inflammatory disease, the method comprising administering to a patient an effective amount of a compound according to any one of [1] to [22] above, or an effective amount of a pharmaceutical composition of [23], or according to other embodiments of the invention.

[31]. The method of [50] above, or according to other embodiments of the invention, wherein the disease or disorder is rheumatoid arthritis or chronic obstructive pulmonary disease.

[32]. A method for treating a disease or disorder in a patient where the disease or disorder involves the dysregulation of hematopoietic cell kinase (HCK) signaling, the method comprising administering to a patient an effective amount of a compound according to any one of [1] to [22] above, or an effective amount of a pharmaceutical composition of [23], or according to other embodiments of the invention.

[33]. A method for inhibiting hematopoietic cell kinase (HCK) activation, said method comprising bringing hematopoietic cell kinase (HCK) into contact with a compound according to any one of [1] to [22] above, or a pharmaceutical composition of [23], or according to other embodiments of the invention.

[34]. The method of [33] above, or according to other embodiments of the invention, wherein the method is an in vitro method.

[35]. The method of [33] above, or according to other embodiments of the invention, wherein the method is an in vivo method.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention. While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. A compound of formula I:

wherein

X is selected from O, NR$^3$, and S;

R$^1$ is selected from O and phenyl optionally substituted with one or more substituents selected from C$_1$-C$_6$ alkyl, C$_1$-C$_6$ alkoxy, C$_1$-C$_6$ fluoroalkyl, and halogen;

R$^2$ is selected from halogen, hydrogen, C$_1$-C$_6$ alkyl, C$_1$-C$_3$ alkoxy, C$_1$-C$_3$ fluoroalkyl, and phenyl;

$R^3$ is selected from hydrogen and $C_1$-$C_6$ alkyl;

Ar is selected from phenyl, a 5-membered heteroaryl, and a 6-membered heteroaryl, wherein said phenyl, 5-membered heteroaryl, or 6-membered heteroaryl is optionally substituted with amino, cyano, halogen, hydroxy, —C(O)NH₂, —C(=O)OR⁴, $C_1$-$C_6$ alkyl, $C_1$-$C_6$ haloalkyl, $C_1$-$C_6$ alkoxy, or $C_1$-$C_6$ haloalkoxy;

$R^4$ is selected from hydrogen and $C_1$-$C_6$ alkyl; and

----- indicates a single bond or a double bond.

2. A compound according to claim 1, wherein X is O.
3. A compound according to claim 1, wherein X is $NR^3$.
4. A compound according to claim 1, wherein $R^1$ is optionally substituted phenyl and ----- is a single bond.
5. A compound according to claim 1, wherein $R^1$ is O and ----- is a double bond.
6. A compound according to claim 1, wherein $R^2$ is halogen.
7. A compound according to claim 1, wherein $R^2$ is hydrogen.
8. A compound according to claim 1, wherein Ar is optionally substituted phenyl.
9. A compound according to claim 1, wherein Ar is an optionally substituted 5-membered heteroaryl.
10. A compound according to claim 1, wherein Ar is an optionally substituted 6-membered heteroaryl.
11. A compound according to claim 1, wherein:
X is O;
$R^1$ is optionally substituted phenyl;
$R^2$ is chloro; and
----- indicates a single bond.
12. A compound according to claim 1, wherein said compound is selected from:

13. A pharmaceutical composition comprising a compound according to claim 1 and a pharmaceutically acceptable carrier, adjuvant, or vehicle.

14. A method for treating fibrosis or a fibrotic disease in a patient, comprising administering to said patient an effective amount of a compound according to claim 1.

15. The method according to claim 14, wherein said fibrosis or fibrotic disease is selected from renal fibrosis; pulmonary fibrosis; cystic fibrosis; cirrhosis; fibrosis of the heart; mediastinal fibrosis; retroperitoneal cavity fibrosis; bone marrow fibrosis; hypertrophic scars; keloids; scleroderma; systemic sclerosis; crohn's disease; peyronie's disease; lupus nephritis; folic acid nephropathy; and fibrosis induced by radiation, infection, chemotherapeutic drugs, surgery, burns, and inhalation.

16. A method for treating a chronic kidney disease, renal fibrosis, or chronic renal allograft injury in a patient, comprising administering to said patient an effective amount of a compound according to claim 1.

17. A method for treating a disease or disorder in a patient chosen from solid malignancy and hematological malignancy, the method comprising administering to the patient a therapeutically effective amount of a compound according to claim 1.

18. The method according to claim 17, wherein the disease or disorder is breast cancer, colon cancer, rectal cancer, stomach cancer, chronic myeloid leukemia, acute lymphoblastic leukemia, a myelodysplastic syndrome, multiple myeloma or a lymphoma.

19. A method for treating a disease or disorder in a patient chosen from an autoimmune or inflammatory disease associated with hematopoietic cell kinase (HCK) signaling, the method comprising administering to the patient a therapeutically effective amount of a compound according to claim 1.

20. A method for inhibiting hematopoietic cell kinase (HCK) activation in vitro, said method comprising bringing hematopoietic cell kinase (HCK) into contact with a compound according to claim 1.

* * * * *